United States Patent [19]
Nava et al.

[11] Patent Number: 5,115,072
[45] Date of Patent: May 19, 1992

[54] REACTIVE RESINS WITH TERMINAL AND/OR PENDANT VINYL GROUPS

[75] Inventors: Hildeberto Nava, Jacksonville, Fla.; Robert D. Lake, Coraopolis; Robert B. Makepeace, Pittsburgh, both of Pa.

[73] Assignee: Reichhold Chemicals, Inc., Durham, N.C.

[21] Appl. No.: 578,064

[22] Filed: Sep. 5, 1990

[51] Int. Cl.$^5$ .................... C08G 18/70; C08G 18/72; C08G 18/81
[52] U.S. Cl. ........................ 528/67; 525/452; 526/301; 528/44; 528/51; 528/59; 528/69
[58] Field of Search .................. 526/301; 528/392, 44, 528/67, 51, 59, 69; 525/452

[56] References Cited
U.S. PATENT DOCUMENTS

| | | | |
|---|---|---|---|
| 3,755,242 | 8/1973 | Reich | 524/437 |
| 4,148,844 | 4/1979 | von Bonin | 528/392 |

OTHER PUBLICATIONS

Kurzer, F. et al., Chem. Rev. 67, No. 2, p. 107 (1967).
Williams, A. et al., Chem. Rev. 81, No. 4, p. 589 (1981).

*Primary Examiner*—Joseph L. Schofer
*Assistant Examiner*—Fred Zitomer
*Attorney, Agent, or Firm*—Rodman & Rodman

[57] ABSTRACT

Saturated and ethylenically unsaturated compounds containing carboxylic, amino or alcohol groups are reacted under mild conditions and in short process times with polycarbodiimides containing free isocyanate units to provide polymers with excellent properties. The unsaturated groups bonded to the polymers are particularly important because these groups provide reactive centers that can be crosslinked, either thermally or in the presence of catalysts that initiate polymerization or by radiation. The polymers can also be crosslinked either alone or by copolymerization with various unsaturated monomers. The resulting crosslinked or cured resins provide excellent properties such as hardness, high elongation, excellent toughness, high heat distortion temperatures and good corrosion resistance.

26 Claims, No Drawings

REACTIVE RESINS WITH TERMINAL AND/OR PENDANT VINYL GROUPS

BACKGROUND OF THE INVENTION

1. Field of the Invention

The present invention concerns the preparation of novel curable, ethylenically unsaturated polymers formed by reacting a polycarbodiimide having free isocyanate groups with compounds having active hydrogens and copolymerizable ethylenic unsaturation. The ethylenically unsaturated, active hydrogen compounds can be partially replaced with saturated compounds.

2. Description of the Prior Art

Vinyl copolymerizable thermosetting resins are in widespread commercial use. Of special interest are those resins, which are capable of rapid cure, and which have outstanding physical and thermal properties.

Most commercially available resins are products of polyester or epoxy chemistry. In general, the preparation of these resins requires high temperatures, several process steps, and long processing time.

U.S. Pat. No. 4,148,844 to von Bonin et al, discloses casting resins consisting of a mixture of polycarbodiimides in vinyl monomers which cure by heating to a temperature above 40° C. The polycarbodiimides are prepared by reacting polyfunctional or monofunctional isocyanates with a phospholane oxide catalyst. The unreacted or free terminal isocyanate groups of the resulting polycarbodiimides can be eliminated by reaction with an amine or alcohol.

U.S. Pat. No. 4,463,158 to O'Connor et al discloses a liquid polymer composition which comprises a modified polyurethane oligomer containing ethylenic unsaturation and a free radical generating catalyst. The polyurethane oligomer is prepared by reacting an organic polyisocyanate with an isocyanate reactive group containing unsaturated monomer to obtain an isocyanate-terminated prepolymer of controlled molecular weight having a free isocyanate content of from about 0.5% to about 30%. The isocyanate-terminated prepolymer is then reacted with a polyol to produce a polyurethane oligomer of controlled molecular weight with terminal reactive unsaturation.

U.S. Pat. No. 4,367,302 to Le Roy et al discloses crosslinkable thermoplastic polyurethanes having isocyanate end groups and containing ethylenic side groups. These polyurethanes are obtained by reacting an organic diisocyanate with a saturated diol and an unsaturated diol. The ethylenic side groups in the polyurethane product are branched over the entire whole length of the linear skeleton of the polyurethane molecule.

U.S. Pat. No. 4,758,625 to Boyack et al discloses urethane crosslinked acrylic coatings. The polymer backbone exhibits the basic characteristics of acrylic polymers and contains at least 50% by weight of acrylic monomer.

U.S. Pat. No. 4,028,310 to Shafer et al relates to the preparation of polyisocyanate containing acylurea groups and, optionally, carbodiimide groups in the polyisocyanate polyaddition reaction carried out in the presence of diamine chain extenders.

U.S. Pat. No. 4,077,989 to Shafer et al relates to the production of modified isocyanates wherein compounds containing isocyanate and carbodiimide groups are reacted with carboxylic acids.

U.S. Pat. No. 4,174,433 and U.S. Pat. No. 4,192,925, both to Shafer et al, relate to polyols modified by guanidine groups, which are used as starting components for the preparation of polyurethane plastics.

U.S. Pat. No. 4,192,926 to Shafer et al relates to polyols modified by acylurea groups used as starting components in the preparation of foamed polyurethane plastics.

U.S. Pat. No. 4,192,927 to Shafer et al relates to polyols modified by phosphonoformamidine groups, for use as a starting component in the preparation of foamed polyurethane plastics.

U.S. Pat. No. 4,321,394 to Shafer et al relates to a process for producing addition compounds of compounds containing hydroxyl groups and carbodiimides substantially free from isocyanate groups, by reacting the components in the presence of an inorganic or organic tin compound used as the catalyst.

Ulrich et al, *Journal of Cellular Plastics*, September–October 1985, pages 350 to 357 reviews the chemistry and properties of low density polycarbodiimide foams and discloses suitable formulations, processing conditions, physical properties and small scale flame test results of the resultant polymers.

Williams et al, "Carbodiimide Chemistry: Recent Advances", *Chem. Rev.*, Vol. 81, pages 589 to 636 (American Chemical Society 1981) is a comprehensive literature review of carbodiimide chemistry covering synthesis, structure and physical properties, chemical properties, metal insertion reactions, formation of heterocycles, carbodiimides in biological and polymer chemistry, and their application in photography, dyeing and related subjects, and analysis.

Kurzer et al, "Advances in the Chemistry of Carbodiimides", *Chemical Reviews*, Vol. 67, No. 2, pages 107 to 152 (Mar. 27, 1967) reviews carbodiimide chemistry including synthesis, physical properties, structure, chemical properties and various carbodiimide compositions.

Wagner et al, "Alpha, Omega-Diisocyanatocarbodiimides, Polycarbodiimides, and Their Derivatives", *Angewandte Chemie* (International edition in English), Vol. 20, No. 10, pages 819–898 (October 1981) discusses the synthesis and properties of these carbodiimides and various reactions particularly the in situ production of polycarbodiimides via matrix reactions in flexible polyurethane foams.

Khorana, "The Chemistry of Carbodiimides", *Chemical Reviews*, Vol. 53, pages 145 to 166 (1953) is a review article covering the preparation and properties of carbodiimides, as well as base catalyzed addition reactions and comparison of carbodiimides with similar systems.

SUMMARY OF THE INVENTION

In accordance with the present invention, saturated and ethylenically unsaturated compounds containing carboxylic, amino or alcohol groups are reacted under mild conditions and in short process times with polycarbodiimides containing free isocyanate units to provide polymers with excellent properties. The unsaturated groups bonded to the polymers are particularly important because these groups provide reactive centers that can be crosslinked, either thermally or in the presence of catalysts that initiate polymerization or by radiation. The polymers can also be crosslinked either alone or by copolymerization with various unsaturated monomers.

The resulting crosslinked or cured resins provide excellent properties such as hardness, high elongation, excellent toughness, high heat distortion temperatures and good corrosion resistance.

DESCRIPTION OF THE PREFERRED EMBODIMENTS

The polymers of this invention, containing isocyanate and carbodiimide, can also be partially branched or crosslinked by reacting the isocyanate groups with the carbodiimide segments, and also by dimerization of the carbodiimide groups.

The combination of polycarbodiimides containing free isocyanate groups and their reaction products with carboxylic acids, amines and alcohols can lead to polymers with segments corresponding to the following general formulae:

 (I)

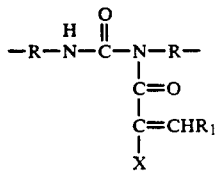 (II)

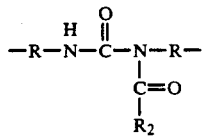 (III)

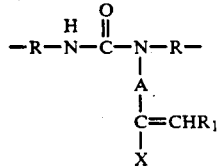 (IV)

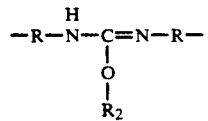 (V)

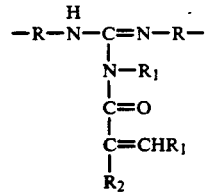 (VI)

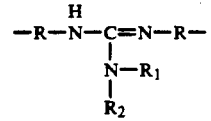 (VII)

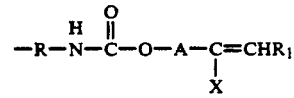 (VIII)

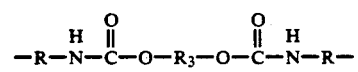 (IX)

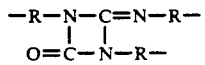 (X)

wherein,

X represents a hydrogen, chlorine, bromine, an aliphatic, cycloaliphatic, aromatic, or araliphatic radical containing from about 1 to 12 carbon atoms;

R represents a difunctional aliphatic, cycloaliphatic, aromatic, or araliphatic radical having from about 4 to 25 carbon atoms, preferably 4 to 15 carbon atoms, and free of any group which can react with isocyanate groups;

$R_1$ represents a hydrogen, an aliphatic, cycloaliphatic, aromatic, araliphatic radical having from about 1 to 12 carbon atoms;

$R_2$ represents a hydrogen or a monovalent radical that can be aliphatic, cycloaliphatic, araliphatic, aromatic, alkyl substituted aromatic, alkyl substituted cycloaliphatic, which can contain one or two double bonds, and which can contain any one or a combination of halogen, phosphorus, silicon, or oxygen groups in any form that does not react with NCO;

$R_3$ represents a divalent radical that can be aliphatic, cycloaliphatic, araliphatic, aromatic, alkyl substituted aromatic, alkyl substituted cycloaliphatic, and can contain any one or a combination of halogen, phosphorus, silicon, or oxygen in any form that does not react with NCO. These groups impart flame retardancy and improve physical and thermal properties. $R_3$ can be derived from various sources including polyether diols, saturated polyester diols, hydroxy terminated polyurethanes and other hydroxy terminated polymers such as polythioethers, polycarbonates, polyacetals, polybutadiene, polybutadiene copolymers and the like.

A represents a divalent group such as:

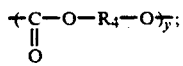

or

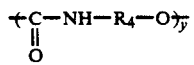

wherein, $R_4$ is a divalent hydrocarbon radical that can be aliphatic or alicyclic; y is an integer from 1 to 8, preferably from 2 to 5, and most preferably 2 or 3.

The aforementioned definitions of R, $R_1$, $R_2$, $R_3$, $R_4$, $R_5$, X and A are consistent with all subsequent formulations represented herein.

The synthesis of these resins can be carried out in the presence or absence of a suitable inert solvent and in general is completed in relatively short times varying from 2 to 10 hours.

Suitable inert solvents include hexane, cyclohexane, benzene, toluene, xylene, chlorobenzene, chloroform, methylene chloride, tetrahydrofuran, ethyl acetate, acetone, styrene, alpha-methyl styrene, divinyl benzene, 4-methyl styrene, 4-ethyl styrene, 4-n-butyl styrene, 4-isopropyl styrene, tert-butyl styrene, 4-chlorostyrene, 3,4-dichlorostyrene, methyl methacrylate, methyl acrylate, n-butyl acrylate, n-butyl methacrylate, allyl methacrylate, isopropyl methacrylate, and solvent mixtures.

The synthesis can be performed in solution, at low temperatures on the order of about 30° C. to 190° C. and preferably about 50° to 80° C. This is particularly advantageous when using ethylenically unsaturated monomers such as styrene, or methyl methacrylate as solvents or copolymerizable monomers.

In one aspect of the invention, these resins can be prepared with pendant and terminal vinyl groups. The first step in preparing resins with terminal vinyl groups is the formation of a polycarbodiimide intermediate with free isocyanate groups starting from a diisocyanate or a mixture of diisocyanates in the presence of a catalyst such as ring or linear pentavalent phosphorus compounds, aluminum alkoxides, arsenic oxides, antimony oxides, sodium alkoxides, naphthenates of Mn, Fe, Co and Cu, and acetyl acetonates of Be, Al, Zn, and Cr, and preferably substituted phospholene oxide or dioxo-oxaphospholane. Alternatively, ionizing radiation or photochemical initiation, such as ultraviolet light can also be used to effect crosslinking.

The diisocyanates which can be used include aliphatic, cycloaliphatic, araliphatic, aromatic and heterocyclic diisocyanates of the type described, for example, by W. Siefken in Justus Liebigs Annalen der Chemie, 562, pages 75 to 136, (1949) for example, those corresponding to the following formula:

OCN—R—NCO     (XI)

wherein, R is as already defined.

Suitable diisocyanates include 1,4-tetramethylene diisocyanate; 1,4 and/or 1,6-hexamethylene diisocyanate; 1,12-dodecane diisocyante; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane; 2,4- and 2,6-hexahydrotolylene diisocyanate and mixtures of these isomers; hexahydro-1,3- and/or 1,4-phenylene diisocyanate; perhydro-2,4'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or 4,4'-diisocyanate; naphthalene-1,5-diisocyanate; 1,3- and 1,4-xylylene diisocyanates, 4,4'-methylene-bis(cyclohexyl isocyanate), 4,4'-isopropyl-bis-(cyclohexyl isocyanate), 1,4-cyclohexyl diisocyanate and 3-isocyanatomethyl-3,5,5-trimethylcyclohexyl isocyanate (IPDI); 1-methoxy-2,4-phenylene diisocyanate; 1-chloropyhenyl-2,4-diisocyante; p-(1-isocyanatoethyl)-phenyl isocyanate; m-(3-isocyanatobutyl)-phenyl isocyanate, and 4-(2-isocyanate-cyclohexyl-methyl)-phenyl isocyanate, and mixtures thereof.

It is also possible in principle to use aliphatic or aromatic diisocyanates of the type which are obtained by reacting excess diisocyanate with difunctional compounds containing hydroxyl or amine groups and which, in practical polyurethane chemistry, are referred to either as "modified isocyanates" or as "isocyanate prepolymers".

In the formation of the polycarbodiimide intermediate, once the polymer has reached a desired molecular weight on the order of about 800 to 40,000 the isocyanate groups and the carbodiimide segments are reacted with saturated or unsaturated monomers having active hydrogens such as carboxylic, amino, alcohol or thio groups.

Examples of these materials include acrylic acid, methacrylic acid, acetic acid, phenylacetic acid, phenoxyacetic acid, propionic acid, hydrocynnamic acid, lauric acid, oleic acid, 4-pentynoic acid, propyolic acid, 2-butynoic acid, acrylamide, methacrylamide, phenethyl amine, propargylamine, diethylamine, dipropylamine, piperazine, n-butylamine, propargyl alcohol, 2-phenoxy ethanol, phenethyl alcohol, 2-butyne-1-ol, 3-butyne-1-ol, 2-pentyne-1-ol, 3-pentyne-1-ol, 4-pentyne-1-ol, and hydroxyalkyl acrylates or methacrylates, such as hydroxyethyl acrylate, hydroxyethyl methacrylate, hydroxypropyl acrylate, hydroxypropyl methacrylate, hydroxybutyl acrylate, hydroxybutyl methacrylate, and the like, and mixtures thereof.

The saturated or unsaturated monomers can include any one or a combination of halogen, phosphorus or silicon groups.

The use of ethylenically unsaturated compounds bonded to the polymer is of particular importance because they provide reactive centers that can be crosslinked. However, the unsaturation can be partially replaced with saturated compounds depending on the desired properties of the resulting resin. Such properties can be tailored in a way that the degree of hardness, elongation, toughness, heat distortion temperatures and corrosion resistance will be dependent on the amount of crosslinking and the percentage of saturated compounds added. This is important for applications such as in bulk molding compounding, sheet molding compounding, resin transfer molding, pultrusion and printed wiring boards.

The polycarbodiimide can then be represented as follows:

OCN—R—N=C=N—R]$_n$NCO     (XII)

wherein n=1 to 25, preferably 1 to 15, and wherein R is as previously defined.

The polycarbodiimide intermediate is then further reacted with saturated or unsaturated monomers having active hydrogens as already described. This further reaction can be conducted in the presence of an organotin catalyst such as dibutyl tin diacetate, or dibutyl tin di-2-ethylhexoate, dibutyl tin dilaurate, dibutyl tin oxide or tertiary amines, such as triethylamine, tributylamine, triethylanediamine tripropylamine, and the like, to form an acrylic derivative of a carbodiimide which is a copolymerizable thermosetting resin with pendant and terminal vinyl groups and which can be represented by the following structural formulae:

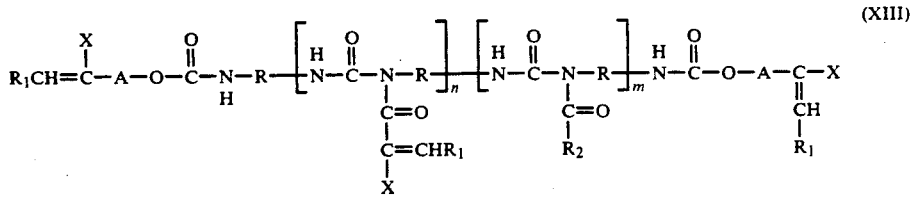

wherein n and m independently=0 to 25, preferably 0 to 15, and m+n are always at least 1.

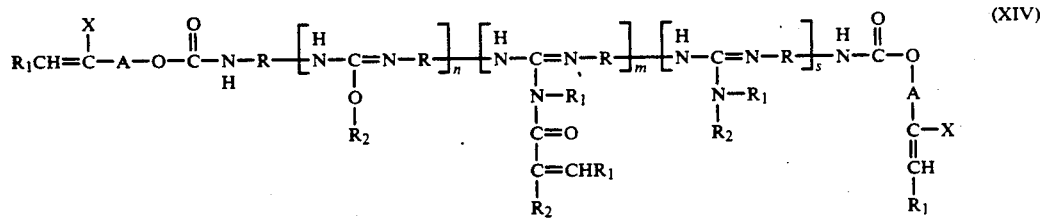

wherein, n, m and s independently=0 to 25, preferably 0 to 15 and m+n+s are always at least 1. X, R, $R_1$, $R_2$, and A, are as already defined.

Another aspect of this invention is the preparation of resins with terminal vinyl groups containing urethane and carbodiimide segments along the polymer backbone. The process begins with prepolymers containing isocyanate terminal groups. These isocyanate prepolymers are prepared from diisocyanates or diisocyanate mixtures with any diol or triol ordinarily used as chain extender to make urethanes corresponding to the following general formula:

wherein $R_3$ is as already defined and p is 2 or 3, which includes polyhydric alcohols having a molecular weight of from about 60 to 250 and also polyester and polyether polyols having a molecular weight of about 150 to 6000, preferably from about 500 to 5000, and most preferably from about 1000 to 4000, of the type known for the preparation of homogeneous and cellular polyurethane plastics.

Examples of such compounds include: ethylene glycol; 1,2-and 1,3-propylene glycol; 1,4 and 2,3-butylene glycol; 1,5-pentane diol; 1,6-hexane diol; 1,8 octane diol; neopentyl glycol; 1,4-bis-hydroxymethyl cyclohexane; 2-methyl-1,3-propane diol; glycerol; trimethylol propane; 1,2,6-hexane triol; trimethylol ethane; pentaerythritol; quinitol; mannitol; sorbitol; diethylene glycol; triethylene glycol; tetraethylene glycol; 1,4-butanediol; polyethylene glycols having a molecular weight of up to 400; dipropylene glycol; ethoxylated and propoxylated bisphenol A; polybutylene glycols having a molecular weight of up to 400; methyl glycoside; diethanolamino-N-methyl phosphonic acid ester; castor oil; diethanolamine; N-methyl ethanolamine; and triethanolamine.

The diols or triols can also include any one or a combination of halogens, such as chlorine, fluorine, bromine, or iodine; or phosphorus, or silicon groups.

The diisocyanates or diisocyanate mixtures are in excess of the diol or trihydric alcohol and react in accordance with the following general equation to form a prepolymer that contains urethane segments and terminal isocyanate groups which can be represented in the following structure:

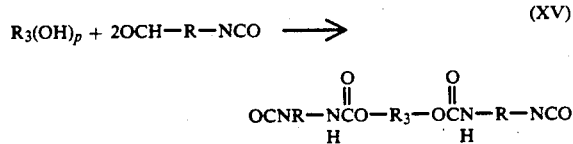

wherein p=2 or 3.

The prepolymer that is formed is then further reacted with the excess diisocyanate remaining from the initial reaction step in the presence of a catalyst such as substituted phospholene oxide or dioxo-oxa-phospholane to form a polycarbodiimide having carbodiimide segments and urethane segments with isocyanate terminal groups in accordance with the following structure:

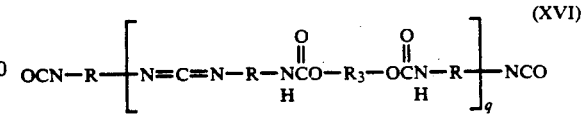

wherein q=1 to 40, preferably 1 to 25.

The polycarbodiimide is then further reacted with a hydroxyalkyl methacrylate wherein the alkyl is ethyl, propyl or butyl in the presence of an organotin catalyst as above mentioned, to form the resin containing the terminal vinyl groups in accordance with the following structure:

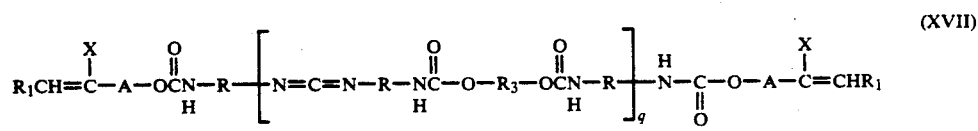

wherein, q=1 to 40, preferably 1 to 25.

The synthesis of these resins is illustrated by the following examples 1 to 11 which show resins containing pendant and terminal unsaturated groups. Example 12 shows preparation of a resin with only terminal vinyl groups. All parts and percentages are by weight unless otherwise noted.

EXAMPLE 1

In a 500 ml three neck flask, 100 grams (0.4498 mole) of isophorone diisocyanate were mixed at room temperature with 0.092 grams (47.87 millimoles) of 3-methyl-1-phenyl-2-phospholene-1-oxide. The temperature was increased to 185° C. and maintained for two hours to form the polycarbodiimide intermediate. Cooling was then applied with a water bath. At 85° C., 80 grams of dimethyl methacrylate were added, allowing the mixture to cool to 60° C. At this temperature, 25 grams of methacrylic acid were added. Cooling was continued using a water bath to control the exotherm of reaction below 90° C. The temperature was allowed to decrease slowly to 75° C. using a water bath and 71.5 grams (0.4959 mole) of hydroxypropyl methacrylate and two drops (approx. 0.032 grams) of dibutyl tin dilaurate were added. The reaction was continued at 70° C. for 2 hours. 4.0 milligrams of toluhydroquinone (THQ) were added and the mixture was cooled to room temperature.

The resulting resin had a light yellow color and was free of NCO or NCN groups as determined by an infrared spectrophotometer model 1310 from Perkin Elmer. Viscosity was measured with a Brookfield viscometer model RVF. Average number and weight number molecular weights were determined by HPLC model 510 from Waters connected to a wisp model 712, a differential difractometer model 410, a Digital computer model 350 and a printer model LA 50. During times were measured by a modified SPI gel test at 180° F. using 1%, 2,5-dimethyl-2,5-bis(2-ethylhexanoylperoxy)hexane (USP 245 from Witco). Perkin Elmer DSC-4 differential scanning calorimeter was used to determine the thermal transitions, using heating rates of 20° C./min. The data is summarized in Table 1.

This reaction can also be carried out in the presence of an inert solvent. The advantage of using an inert solvent such as styrene or methyl methacrylate, is that the extent of side reactions is reduced, and a greater yield of linear polymer rather than branched polymer is obtained. After preparation of the acrylic derivative of carbodiimide resin is completed, it is already in the presence of unsaturated monomers and is ready to be catalyzed for end use applications. In addition, the reaction in solution can occur at low temperatures on the order of 80° C.

EXAMPLE 2

In a two liter reactor, 400 grams (1.6 mole) of diphenylmethane diisocyanate (MDI) was dissolved in 320 milliliters of styrene. At 75° C., 0.328 grams (1.707 millimole) of 3-methyl-1-phenyl-2-phospholene-1-oxide catalyst was added. Evolution of $CO_2$ began immediately. The reaction was continued for two hours at 75° C. 312 grams (2.39 mole) of hydroxyethyl methacrylate (HEMA) was added allowing the mixture to cool to 45° C. Two drops (approx. 0.032 grams) of dibutyl tin dilaurate were added. Cooling was applied with a water bath to control the exotherm at 75° C. to 80° C. At 55° C., 80 grams (0.93 mole) of methacrylic acid was added. The temperature was allowed to rise to 65° C. The reaction was continued at 60° C. for 1 hour. Heat was removed, and 1 part per million (ppm) of Cu naphthenate was added and mixed for 20 minutes. The mixture was then cooled to ambient temperature.

The resulting resin had a clear to light yellow color and was free of NCO or NCN groups as determined by infrared spectroscopy by the disappearance of IR bands at 2270 and 2120 $cm^{-1}$, corresponding respectively to these groups. Curing behavior for resins of this type is presented in Table 1.

EXAMPLES 3-8

The procedure of Example 2 was followed with the exception that different ratios of hydroxyethyl or hydroxypropyl methacrylate, methacrylic acid, styrene and methyl methacrylate were used. A mixture of diphenylmethane diisocyanate:toluene diisocyanate in a 50:50 molar ratio was used instead of only diphenylmethane diisocyanate. The results of these experiments are summarized in Table 1.

EXAMPLES 9-10

The procedure of Example 2 was followed with the exception that different ratios between a mixture of 50:50 molar ratio of diphenylmethane diisocyanate:toluene diisocyanate, and acetic acid instead of methacrylic acid were used. The results of these experiments are summarized in Table 1.

EXAMPLE 11

The procedure of Example 2 was followed, with the following modifications. A mixture of a 50:50 molar ratio of diphenylmethane diisocyanate:toluene diisocyanate was used in this example. Methacrylic acid was not included in the reaction. Instead, only hydroxyethyl methacrylate was used to react the isocyanate groups and to partially react the carbodiimide segments. The resin had about 15% unreacted carbodiimide segments, as determined by infrared spectroscopy. The results of this experiment are summarized in Table 1.

EXAMPLE 12

Resins containing carbodiimide segments and ethylenically unsaturated terminal groups are shown in this example.

In a three liter reactor 214.4 grams (0.8576 mole) of diphenylmethane diisocyanate (MDI) and 149.35 grams of 2,6 and 2,4-toluene diisocyanate (80:20 mixture, TDI) were dissolved at 45° C. with 500 ml of styrene. To this mixture was added 62.5 grams (0.60 mole) of neopentyl glycol (NPG). The temperature slowly increased to 82° C. due to the exotherm of reaction between the isocyanate and hydroxy groups. The exotherm was allowed to subside and the temperature stabilized at 60° C. At this temperature, two drops of dibutyl tin dilaurate (approximately 0.032 grams) were added and the reaction allowed to exotherm to approximately 65°-70° C. The temperature was set at 75° C. and 0.30 grams (1.56 millimole) of 3-methyl-1-phenyl-2-phospholene-1-oxide was added. Evolution of $CO_2$ began immediately. The reaction was continued for 3 hours. 230 grams (1.767 mole) of hydroxyethyl methacrylate were added and the temperature was allowed to decrease to 48°-50° C., after which two drops of dibutyl tin dilaurate were added. The exotherm was then controlled between 65° to 70° C. Once the exotherm subsided, the reaction was continued for 30 minutes at 60° C., then, 92.7 milligrams of toluhydroquinone and 0.93 milligrams of Cu naphthenate 6% solution were added. Mixing was continued for 20 more minutes and the mixture was cooled to room temperature.

The resin had a clear to light yellow color and contained NCN groups as determined by infrared spectroscopy. Curing behavior for this type of resin is presented in Table 1.

Clear castings were prepared by curing the resins with 1% USP 245 (Witco Chemical Co.) at 150° F. for one hour and then post-cured at 250° F. for one more hour. Studies of these castings showed excellent mechanical and physical properties. Some representative results are presented in Table 2 together with properties of commercially available resins for comparison. A general comparison of these properties, showed that the polymers derived from polycarbodiimides can provide materials with higher tensile and flexural strength. In addition, the elongation can be modified according to the amount of crosslinking groups present in the polymer backbone. Table 2 summarizes all important physical properties and characteristics of resins from this invention as well as thermal properties including heat distortion temperature (HDT) and glass transition temperature (Tg). Values for commercial resins have also been included in the upper part of Table 2 for comparison.

TABLE 1

COMPOSITION AND PROPERTIES OF RESINS

| | EXAMPLES* | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| DIPHENYLMETHANE DIISOCYANATE (MDI) | — | 1.60 | 2.80 | 3.43 | 3.43 | 3.43 | 3.43 | 3.43 | 3.43 | 0.86 | 0.86 | 0.86 |
| 2,4 & 2,6-TOLUENE DIISOCYANATE (TDI) | — | — | 2.80 | 3.43 | 3.43 | 3.43 | 3.43 | 3.43 | 3.43 | 0.86 | 0.86 | 0.86 |
| ISOPHORONE DIISOCYANATE (IPDI) | 0.45 | — | — | — | — | — | — | — | — | — | — | — |
| HYDROXYETHYL METHACRYLATE | — | 2.39 | 7.53 | 7.30 | 5.38 | 5.38 | — | — | 9.99 | 1.50 | 2.11 | 1.77 |
| HYDROXYPROPYL METHACRYLATE | 0.42 | — | — | — | — | — | 6.94 | 7.30 | — | — | — | — |
| METHACRYLIC ACID | 0.29 | 0.93 | 3.66 | 3.02 | 2.44 | 3.02 | 2.56 | 3.02 | — | — | — | — |
| ACETIC ACID | — | — | — | — | — | — | — | — | 0.83 | 0.80 | — | — |
| NEOPENTYL GLYCOL | — | — | — | — | — | — | — | — | — | — | — | 0.60 |
| WT. % STYRENE | — | 29.7 | 31.4 | 30.1 | 37.5 | 34.7 | 31.4 | — | 32.8 | 39.2 | 39.9 | 43.6 |
| WT. % METHYL METHACRYLATE | 31.1 | — | — | — | — | — | — | 29.6 | — | — | — | — |
| VISCOSITY (POISE) | 4.00 | 4.30 | 2.30 | 9.00 | 102.0 | 13.0 | 12.5 | 7.2 | 4.6 | 2.7 | 2.6 | 6.5 |
| Mn | 1,050 | 2,100 | 1,080 | 1,286 | 2,056 | 1,576 | 1,413 | 1,369 | 1,605 | 1,260 | 1,300 | 2,600 |
| Mw/Mn | 1.2 | 2.2 | 1.2 | 1.5 | 7.7 | 2.0 | 1.9 | 1.9 | 2.8 | 1.5 | 1.9 | 3.0 |
| 180° F. SPI GEL TEST. CATALYST 1% USP-245 | | | | | | | | | | | | |
| GEL TIME, MIN. | 2.2 | — | 6.1 | 3.2 | 4.4 | 3.6 | 3.4 | 3.3 | 1.9 | 3.2 | 1.5 | 2.8 |
| GEL TO PEAK, MIN. | 1.8 | — | 3.3 | 2.8 | 3.2 | 4.2 | 4.0 | 2.0 | 1.1 | 2.0 | 1.6 | 1.2 |
| PEAK TIME, MIN. | 4.0 | — | 9.4 | 6.0 | 7.6 | 7.8 | 7.4 | 5.3 | 3.0 | 5.2 | 3.10 | 4.0 |
| PEAK EXOTHERM, °C. | 180 | — | 225 | 220 | 2.3 | 213 | 2.5 | 191 | 250 | 224 | 242 | 239 |

*AMOUNTS IN MOLES/GRAM

TABLE 2

PHYSICAL PROPERTIES OF RESINS.

| | KOPPERS 3700-25 | DION FR 6695 | ATLAC 797 | VER 9400 | VER 9420 | ATLAC 382 | DION CR 6694 | ATLAC 570 |
|---|---|---|---|---|---|---|---|---|
| HDT, °F. | 338 | 277 | 239 | 250 | 266 | 231 | 277 | 302 |
| (°C.) | (170) | (136) | (115) | (120) | (130) | (110) | (136) | (150) |
| Tg, °F. | * | 305 | 273 | 298 | 316 | 277 | 340 | 311 |
| (°C.) | * | (152) | (134) | (148) | (158) | (136) | (171) | (156) |
| FLEX STRENGTH, PSI | 10600 | 14800 | 11500 | 18300 | 13400 | 16500 | 10000 | 20200 |
| FLEX MODULUS, 10^6 PSI | 0.57 | 0.52 | 0.56 | 0.52 | 0.53 | 0.46 | 0.48 | 0.53 |
| TENSILE STRENGTH, PSI | 5400 | 7000 | 7000 | 10900 | 8300 | 11300 | 6600 | 10500 |
| TENSILE MODULUS, 10^6 PSI | 0.53 | 0.51 | 0.52 | 0.51 | 0.49 | 0.46 | 0.49 | 0.49 |
| TENSILE ELON., % | 1.07 | 1.59 | 1.48 | 2.63 | 1.98 | 3.6 | 1.55 | 2.70 |
| TOUGHNESS (FLEX.) (in-lb/in³) | 11.52 | 29.4 | 13.4 | 46.6 | 20.9 | 44.4 | 12.1 | 63 |
| TOUGHNESS (TENSILE) (in-lb/in³) | 34.3 | 64.2 | 63.2 | 171.6 | 93.9 | 260.6 | 59.8 | 164 |

| | PHYSICAL PROPERTIES OF RESINS. | | | | | | |
|---|---|---|---|---|---|---|---|
| | ATLAC 1041 | ATLAC 1070 | ATLAC M-1070 | EXAMPLES OF INVENTION | | | |
| | | | | 3 | 10 | 11 | 12 |
| HDT, °F. | 293 | 311 | 273 | 250 | 250 | 259 | 273 |
| (°C.) | (145) | (155) | (134) | (121) | (121) | (126) | (134) |
| Tg, °F. | 302 | 320 | 320 | 295 | 342 | 329 | 302 |
| (°C.) | (150) | (160) | (160) | (146) | (172) | (165) | (150) |
| FLEX STRENGTH, PSI | 19100 | 17400 | 20000 | 22600 | 20000 | 19900 | 22100 |
| FLEX MODULUS, 10^6 PSI | 0.56 | 0.56 | 0.49 | 0.53 | 0.58 | 0.53 | 0.53 |
| TENSILE STRENGTH, PSI | 8600 | 7900 | 10200 | 9750 | 8500 | 10990 | 12500 |

TABLE 2-continued

| | | | | | | | |
|---|---|---|---|---|---|---|---|
| TENSILE MODULUS, $10^6$ PSI | 0.55 | 0.56 | 0.50 | 0.56 | 0.59 | 0.51 | 0.50 |
| TENSILE ELON., % | 1.80 | 1.60 | 2.6 | 2.00 | 1.62 | 2.56 | 3.5 |
| TOUGHNESS (FLEX.) (in-lb/in$^3$) | 49 | 35 | 72.8 | 87 | 43.5 | 59 | 117 |
| TOUGHNESS (TENSILE) (in-lb/in$^3$) | 88 | 68 | 174.6 | 105 | 76 | 167 | 316 |

Each of the comparative resin products included in the heading of Table 2 and identified by trademark designations were dissolved in styrene and are further identified as follows:

Koppers TM 3700-25 (Reichhold Chemicals, Inc.) is a propylene glycol maleate polyester resin.

Dion TM FR 6695 (Diamond Alkali Co.) is a brominated bisphenol A-fumarate polyester resin.

Atlac TM 797 (Atlas Chemical Industries, Inc.) is a neopentyl glycol-chlorendic polyester resin.

VER TM 9400 and VER TM 9420 (Reichhold Chemicals, Inc.) are highly cross-linked vinyl ester resins.

Atlac TM 382 (Atlas Chemical Industries, Inc.) is a bisphenol-fumarate polyester resin.

Dion TM CR 6694 (Diamond Alkali Co.) is a bisphenol-fumarate polyester resin.

Atlac TM 570 (Atlas Chemical Industries, Inc.) is an epoxy novalac vinyl ester resin.

Atlac TM 1041, Atlac TM 1070 and Atlac TM M-1070 (Atlas Chemical Industries, Inc.) are acrylic isocyanurate resins.

We claim:

1. A method for forming a copolymerizable thermosetting resin with pendant and terminal vinyl groups comprising:

(a) reacting at least two diisocyanates, which have the structural formula:

OCN—R—NCO wherein R represents a difunctional aliphatic, cycloaliphatic, aromatic, or araliphatic radical having from about 2 to 25 carbon atoms, and free of any group which can react with isocyanate groups to form a polycarbodiimide intermediate:

OCN—R—N=C=N—R]$_n$NCO (b) and further reacting said polycarbodiimide intermediate with a saturated or unsaturated monomer having an active hydrogen selected from the group consisting of carboxylic, amino, alcohol or thio groups, to form said copolymerizable thermosetting resin with pendant and terminal vinyl groups as follows:

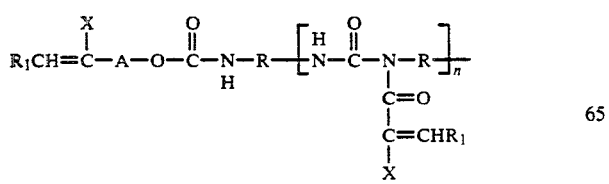

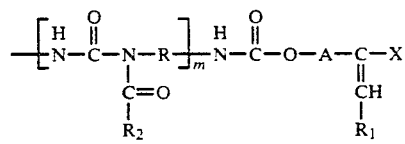

wherein n+m independently=0 to 25, and n+m are at least 1; or

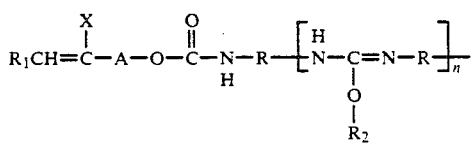

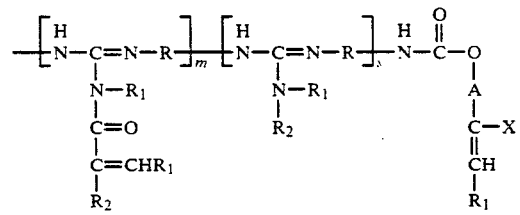

wherein n+m+s=0 to 25, and n+m+s are at least 1;

X represents hydrogen, chlorine, bromine, an aliphatic, cycloaliphatic, aromatic, or araliphatic radical containing from about 1 to 12 carbon atoms;

R represents a difunctional aliphatic, cycloaliphatic, aromatic, or araliphatic radical having from about 2 to 25 carbon atoms, and free of any group which can react with isocyanate groups;

$R_1$ represents hydrogen, an aliphatic, cycloaliphatic, aralophatic radical having from about 1 to 12 carbon atoms;

$R_2$ represents hydrogen or a monovalent radical selected from the group consisting of aliphatic, cycloaliphatic, araliphatic, aromatic, alkyl substituted aromatic, and alkyl substituted cycloaliphatic, which contains one or two double bonds; and A represents a divalent group selected from the group consisting of:

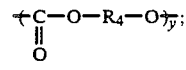

or

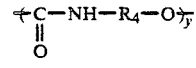

wherein, $R_4$ is a divalent hydrocarbon radical that is aliphatic or alicyclic and y is an integer from 1-8.

2. The method of claim 1, wherein $R_2$ includes any one or a combination of halogen, phosphorus, silicon or oxygen groups in any form that does not react with an isocyanate group.

3. A method for forming a copolymerizable thermosetting resin with terminal vinyl groups comprising:
(a) reacting a low molecular weight diol or triol with an excess of diisocyanate, or a mixture of diisocyanates to form a prepolymer with urethane segments and terminal isocyanate groups in accordance with the following equation:

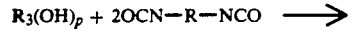
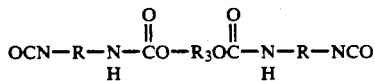

(b) further reacting said prepolymer with the excess diisocyanate, OCN—R—NCO from the initial reaction to form a polycarbodiimide having carbodiimide segments and urethane segments with isocyanate terminal groups in accordance with the following structure:

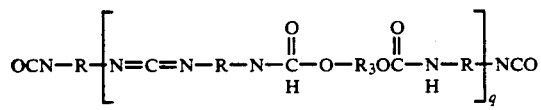

and, (c) further reacting the polycarbodiimide with a hydroxyalkyl methacrylate wherein the alkyl is ethyl, propyl or butyl in the presence of a catalyst to form said resin with terminal vinyl groups as follows:

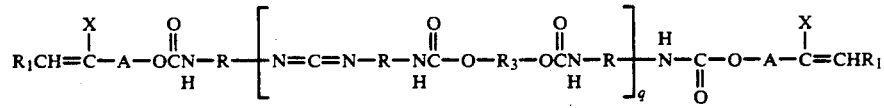

wherein R represents a difunctional aliphatic, cycloaliphatic, aromatic, or araliphatic radical having from about 2 to 25 carbon atoms, and free of any group which can react with isocyanate groups; $R_1$ represents a hydrogen, an aliphatic, cycloaliphatic, aromatic, araliphatic radical having from about 1 to 12 carbon atoms; $R_3$ represents a divalent radical selected from the group consisting of aliphatic, cycloaliphatic, araliphatic, aromatic, alkyl substituted aromatic, alkyl substituted cycloaliphatic; A represents a divalent group selected from the group consisting of:

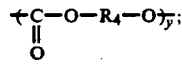

or

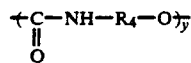

wherein, $R_4$ is a divalent hydrocarbon radical that is aliphatic or alicyclic; y is an integer from 1 to 8; p is 2 or 3; and q=1 to 40.

4. The method of claim 1, wherein $R_3$ includes any one or a combination of halogen, phosphorus, silicon or oxygen groups in any form that does not react with an isocyanate group.

5. The method of claim 4, wherein the amount of diol or triol varies from about 0.05 to 0.5 moles per mole of diisocyanate.

6. The method of claim 4, wherein the diol or triol is selected from the group consisting of ethylene glycol, 1,2-and 1,3-propylene glycol; 1,4 and 2,3-butylene glycol; 1,5-pentane diol; 1,6-hexane diol; 1,8 octane diol; neopentyl glycol; 1,4-bis-hydroxymethyl cyclohexane; 2-methyl-1,3-propane diol; glycerol; trimethylol propane; 1,2,6-hexane triol; trimethylol ethane; pentaerythritol; quinitol; mannitol; sorbitol; diethylene glycol; triethylene glycol; tetraethylene glycol; 1,4-butanediol; polyethylene glycols having a molecular weight of up to 400; dipropylene glycol; ethoxylated and propoxylated bisphenol A; polybutylene glycols having a molecular weight of up to 400; methyl glycoside; diethanolamino-N-methyl phosphonic acid ester; castor oil; diethanolamine; N-methyl ethanolamine; and triethanolamine.

7. The method of claim 6, wherein the diol or triol also includes a halogen, or a phosphorus, or a silicon group, or combination thereof.

8. The method of claim 1, wherein the diisocyanate is selected from the group consisting of aliphatic, cycloaliphatic, araliphatic, or aromatic diisocyanates and mixtures thereof.

9. The method of claim 8, wherein the diisocyanates are selected from the group consisting of 1,4-tetramethylene diisocyanate; 1,4 and /or 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane; 2,4- and 2,6-hexahydrotolylene diisocyanate and mixtures of these isomers; hexahydro-1,3-and/or 1,4-phenylene diisocyanate; perhydro-2,4'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and-/or 4,4'-diisocyanate; naphthalene-1,5-diisocyanate; 1,3- and 1,4-xylylene diisocyanates, 4,4'-methylene-bis(cyclohexyl isocyanate), 4,4'-isopropyl-bis-(cyclohexyl isocyanate), 1,4-cyclohexyl diisocyanate and 3-isocyanatomethyl-3,5,5-trimethylcyclohexyl isocyanate (IPDI); 1-methoxy-2,4-phenylene diisocyanate; 1-chlorophenyl-2,4-diisocyanate; p-(1-isocyanatoethyl)-phenyl isocyanate; m-(3-isocyanatobutyl)-phenyl isocyanate and 4-(2-isocyanate-cyclohexyl-methyl)-phenyl isocyanate, and mixtures thereof.

10. The method of claim 1(b), wherein the monomer is saturated and selected from the group consisting of acetic acid, phenylacetic acid, phenoxyacetic acid, propionic acid, lauric acid, oleic acid, propyolic acid, phenethylamine, diethylamine, dipropylamine, piperazine, n-butylamine, 2-phenoxy ethanol, phenethyl alcohol, and mixtures thereof.

11. The method of claim 10, wherein the saturated monomer includes a halogen, or a phosphorus, or a silicon group, or combination thereof.

12. The method of claim 1(b) wherein the monomer is unsaturated and is selected from the group consisting of: acrylic acid, methacrylic acid, hydrocynnamic acid, 4-pentynoic acid, 2-butynoic acid, acrylamide, methacrylamide, propargylamine, propargyl alcohol, 2-butyne-1-ol, 3-butyne-1-ol, 2-pentyne-1-ol, 3-pentyne-1-ol, 4-pentyne-1-ol, hydroxyalkyl acrylates, hydroxyalkyl methacrylates, and mixtures thereof.

13. The method of claim 12, wherein the unsaturated monomer includes a halogen, or a phosphorus, or a silicon group, or combination thereof.

14. The method of claim 1, wherein an inert solvent is used.

15. The method of claim 1, wherein the inert solvent is selected from the group consisting of hexane, cyclohexane, benzene, toluene, xylene, chlorobenzene, chloroform, methylene chloride, tetrahydrofuran, ethyl acetate, acetone, styrene, alpha-methyl styrene, divinyl benzene, 4-methyl styrene, 4-ethyl styrene, 4-n-butyl styrene, 4-isopropyl styrene, tert-butyl styrene, 4-chlorostyrene, 3,4-dichlorostyrene, methyl methacrylate, methyl acrylate, n-butyl acrylate, n-butyl methacrylate, allyl methacrylate, isopropyl methacrylate, and solvent mixtures.

16. The method of claim 1, wherein the synthesis is performed at temperatures of about 30° to 190° C.

17. The method of claim 1, wherein the polycarbodiimide intermediate is formed in the presence of a catalyst.

18. The method of claim 1, wherein the copolymerizable thermosetting resin with pendant and terminal vinyl groups is formed in the presence of a catalyst.

19. The method of claim 3, wherein the diisocyanate is selected from the group consisting of aliphatic, cycloaliphatic, araliphatic, aromatic or heterocyclic diisocyanates and mixtures thereof.

20. The method of claim 3, wherein the diisocyanates are selected from the group consisting of 1,4-tetramethylene diisocyanate; 1,4 and/or 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane; 2,4-and 2,6-hexahydrotolylene diisocyanate and mixtures of these isomers; hexahydro-1,3- and/or 1,4-phenylene diisocyanate; perhydro-2,4'- and/or 4,4'-diphenyl methane diisocyanate; 1,3-and 1,4-phenylene diisocyanate; 2,4- and 2,6-tolylene diisocyanate and mixtures of these isomers; diphenyl methane-2,4'- and/or 4,4'-diisocyanate; naphthalene-1,5-diisocyanate; 1,3- and 1,4-xylylene diisocyanates, 4,4'-methylene-bis-(cyclohexyl isocyanate), 4,4'-isopropyl-bis-(cyclohexyl isocyanate), 1,4-cyclohexyl diisocyanate and 3-isocyanatomethyl-3,5,5-trimethylcyclohexyl isocyanate (IPDI); 1-methyoxy-2,4-phenylene diisocyanate; 1-chlorophenyl-2,4-diisocyanate; p-(1-isocyanatoethyl)-phenyl isocyanate; m-(3-isocyanatobutyl)-phenyl isocyanate and 4-(2-isocyanatecyclohexyl-methyl)-phenyl isocyanate, and mixtures thereof.

21. A copolymerizable thermosetting resin with pendant and terminal vinyl groups as follows:

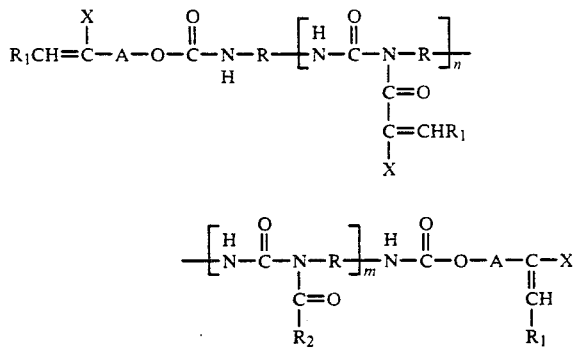

wherein n+m independently=0 to 25, and n+m are at least 1;

X represents hydrogen, chlorine, bromine, an aliphatic, cycloaliphatic, aromatic, or araliphatic radical containing from about 1 to 12 carbon atoms;

R represents a difunctional aliphatic, cycloaliphatic, aromatic, or araliphatic radical having from about 2 to 25 carbon atoms, and free of any group which can react with isocyanate groups;

$R_1$ represents hydrogen, an aliphatic, cycloaliphatic, aromatic, araliphatic radical having from about 1 to 12 carbon atoms;

$R_2$ represents hydrogen or a monovalent radical selected from the group consisting of aliphatic, cycloaliphatic, araliphatic, aromatic, alkyl substituted aromatic, and alkyl substituted cycloaliphatic, which contains one or two double bonds; and A represents a divalent group selected from the group consisting of:

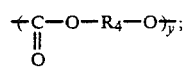

or

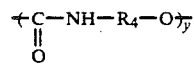

wherein, $R_4$ is a divalent hydrocarbon radical that is aliphatic or alicyclic and y is an integer from 1–8.

22. The resin of claim 21, wherein $R_2$ also includes any one or a combination of halogen, phosphorus, silicon or oxygen groups in any form that does not react with an isocyanate group.

23. A copolymerizable thermosetting resin with pendant and terminal vinyl groups as follows:

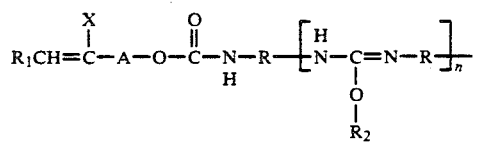

-continued

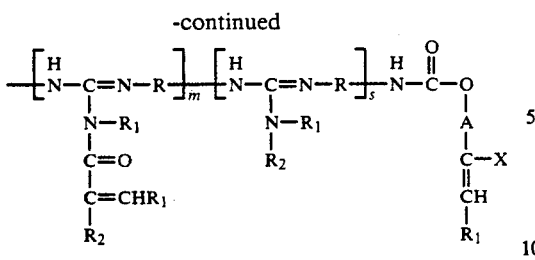

wherein n+m+s=0 to 25, and n+m+s are at least 1;

X represents hydrogen, chlorine, bromine, an aliphatic, cycloaliphatic, aromatic, or araliphatic radical containing from about 1 to 12 carbon atoms;

R represents a difunctional aliphatic, cycloaliphatic, aromatic, or araliphatic radical having from about 2 to 25 carbon atoms, and free of any group which can react with isocyanate groups;

$R_1$ represents hydrogen, an aliphatic, cycloaliphatic, aromatic, araliphatic radical having from about 1 to 12 carbon atoms;

$R_2$ represents hydrogen or a monovalent radical selected from the group consisting of aliphatic, cycloaliphatic, araliphatic, aromatic, alkyl substituted aromatic, and alkyl substituted cycloaliphatic, which contains one or two double bonds; and A represents a divalent group selected from the group consisting of:

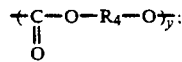

or

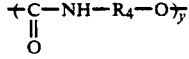

wherein, $R_4$ is a divalent hydrocarbon radical that is aliphatic or alicyclic and y is an integer from 1-8.

24. The resin of claim 23, wherein $R_2$ also includes any one or a combination of halogen, phosphorus, silicon or oxygen groups in any form that does not react with an isocyanate group.

25. The resin of claim 17, wherein $R_3$ also includes any or one of a combination of halogen, phosphorus, silicon or oxygen groups in any form that does not react with the isocyanate group.

26. A copolymerizable resin with terminal vinyl groups comprising

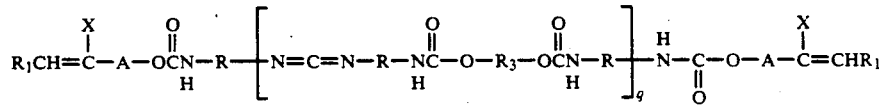

wherein R represents a difunctional aliphatic, cycloaliphatic, aromatic, or araliphatic radical having from about 2 to 25 carbon atoms, and free of any group which can react with isocyanate groups; $R_1$ represents a hydrogen, an aliphatic, cycloaliphatic, aromatic, araliphatic radical having from about 1 to 12 carbon atoms; $R_3$ represents a divalent radical selected from the group consisting of aliphatic, cycloaliphatic, araliphatic, aromatic, alkyl substituted aromatic, alkyl substituted cycloaliphatic; A represents a divalent group such as:

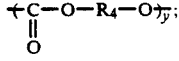

or

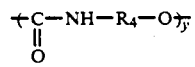

wherein, $R_4$ is a divalent hydrocarbon radical that is aliphatic or alicyclic; y is an integer from 1 to 8; p is 2 or 3; and q=1 to 40.

* * * * *

UNITED STATES PATENT AND TRADEMARK OFFICE
CERTIFICATE OF CORRECTION

PATENT NO. : 5,115,072
DATED : May 19, 1992
INVENTOR(S) : Hildeberto Nava et al

It is certified that error appears in the above-indentified patent and that said Letters Patent is hereby corrected as shown below:

column 5, line 40, change "diisocyante" to --diisocyanate-- column 5, line 57, change "diisocyante" to --diisocyanate-- column 6, line 51, change

"$OCN-R-N=C=N-R\big]_n NCO$"

to     $--OCN-R\left[-N=C=N-R\right]_n NCO--$

UNITED STATES PATENT AND TRADEMARK OFFICE
CERTIFICATE OF CORRECTION

PATENT NO. : 5,115,072
DATED : May 19, 1992
INVENTOR(S) : Hildeberto Nava et al

It is certified that error appears in the above-indentified patent and that said Letters Patent is hereby corrected as shown below:

column 8, line 33, change "$R_3(OH)_p + 2OCH-R-NCO \longrightarrow$"
to --$R_3(OH)_p + 2OCN-R-NCO \longrightarrow$-- column 9, line 35, change "During" to --Curing-- column 13, line 51, change

"$OCN-R-N=C=N-R \big]_n NCO$"

to     --$OCN-R\big[N=C=N-R\big]_n NCO$--

Signed and Sealed this

Twenty-fourth Day of August, 1993

Attest:

BRUCE LEHMAN

Attesting Officer        Commissioner of Patents and Trademarks